Aug. 9, 1949.  P. MARECAUX  2,478,295
CARBONIZATION PLANT

Filed July 20, 1945  5 Sheets-Sheet 1

Fig.1

Inventor
P. Marecaux

Aug. 9, 1949.                P. MARECAUX                 2,478,295
                           CARBONIZATION PLANT
Filed July 20, 1945                                  5 Sheets-Sheet 2

Patented Aug. 9, 1949

2,478,295

UNITED STATES PATENT OFFICE 2,478,295

CARBONIZATION PLANT

Paul Marecaux, Laverhne, France, assignor to Societe Anonyme dite: Louvroil-Montbard-Aulnoye, Paris, France Application July 20, 1945, Serial No. 606,108
In France April 13, 1942

Section 1, Public Law 690, August 8, 1946
Patent expires April 13, 1962

11 Claims. (Cl. 202—127)

The present invention has for object an improved plant for the low temperature carbonization of solid fuels (coals, lignites, bituminous, oleaginous schists), in which can be obtained the best possible yield in oil, consistent with the production of an oil as free from cracking and dust as possible, a favorable thermal balance and reduced cumbersomeness of the plant.

In the accompanying drawing wherein the invention is illustrated.

Figure 1:
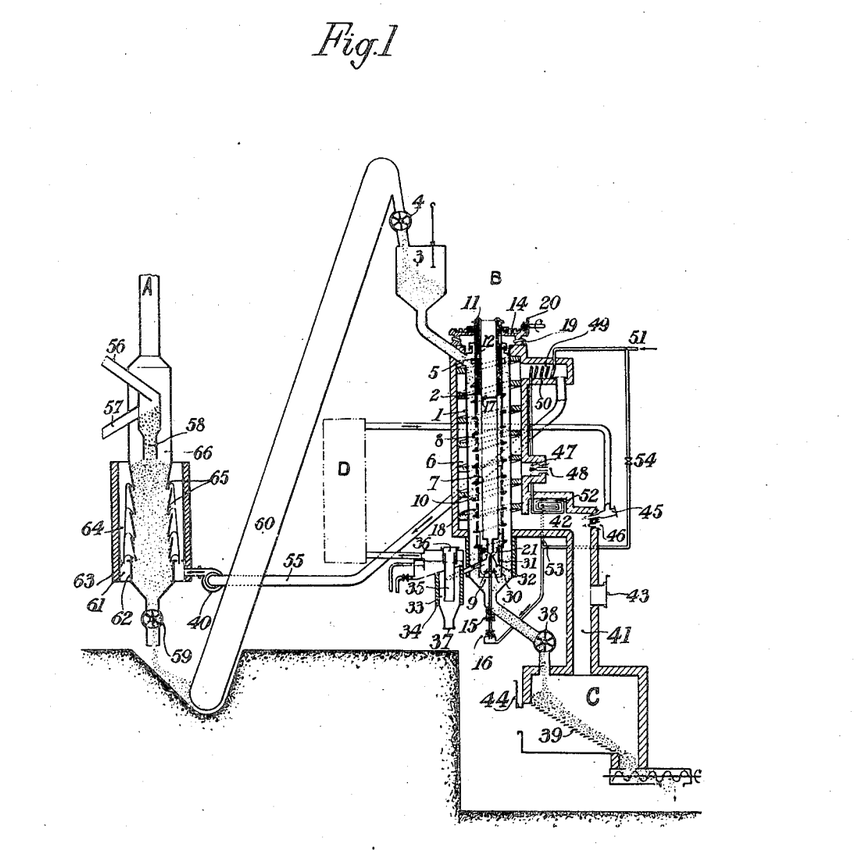
Fig. 1 diagrammatically illustrates a complete plant.

In a complete plant, illustrated in the accompanying drawing, A is the drier, B the carbonization furnace proper and C the enclosure for recovering the free heat and combustion heat of the residue. D illustrates, as a reminder, any device for condensing the oils.

The carbonization furnace proper, B, is a vertical apparatus essentially constituted by two concentric tubes: the heating tube 1, stationary, and the inner tube 2 receiving a slow movement of rotation. The schist which comes from a regularizing hopper 3, fed by the distributor 4, circulates by gravity from top to bottom between the two tubes. Projections 5, distributed on one and the same horizontal plane of the inner tube and rigid with said tube ensure a satisfactory distribution of the schist at the top of the furnace.

The heating tube is surrounded by a helical flue 6, in which the heating fumes circulate at high speed.

The outer tube 1 is made of thin steel, from a welded or unwelded tube of ordinary steel or special steel.

The inner rotating tube 2 can be made of steel or pig-iron. It comprises within it, the system for rapidly evacuating the gases and oil vapours essentially constituted by manifolds 7, communicating with the carbonization enclosure by vents 8, passing through the tube 2 and opening at the base of the furnace in the expansion chamber 9, in which exists the partial vacuum produced by the extractor of the condensation apparatus. The cross section of the manifolds is as reduced as possible, taking into account such conditions as are necessary to insure continued and successful operation of the plant. This device is adapted to rapidly evacuate the gases and oil vapours as soon as they are formed and to avoid their stagnation in prejudicial spaces subjected to a high temperature, resulting in an important reduction of cracking phenomena.

The vents are distributed according to the intersections of the generatrices of tube 1 corresponding to the manifold tubes 7 and of one or more spirals of the same pitch traced on tube 1. A spiral 10, the width of which occupies approximately half the width of the carbonization enclosure is rigidly secured to tube 2, passes slightly above all the vents and thus protects them from any entrance of schist.

The section of passage-way of the vents is adapted to the outflow of the gases and oil vapours, according to their level in the furnace. Said outflow is, in fact more important in the zone located approximately between the lower third and sixth part of the useful height of the furnace. It is therefore in said zone, in which the suction must be the most powerful, that the section of passage-way of the vents is maximum.

On the other hand, the tube 2 receives a movement of rotation in such a direction that the spiral tends to cause the schist to move upwardly and to thus oppose the action of gravity. A stirring of the schist and a friction against the wall of tube 1 result therefrom, which consequently increases the transmission of heat between the wall and the schist, as well as between the pieces of schist themselves.

The manifolds communicate through the vents with the carbonization enclosure only up to a certain level above which the schist is not yet sufficiently hot to evolve gases and vapours. The manifolds nevertheless extend to the top of tube 2, so as to facilitate the cleaning thereof. They are closed by plugs 11, extended by cores 12, intended to obstruct the unused lengths and to avoid stagnations of gases and oil vapours.

The device 14 for rotating the inner tube allows the top of the tube to be entirely free, which facilitates the access of the plugs by removing a single cover. The space comprised in tube 2, between the manifolds, is occupied by superheated steam under pressure, which has access thereto through tubes 15a and 16a issuing through the bottom of the furnace and joining with the superheated steam conduit 53 by fluid-tight packings 15 and 16 respectively.

Figures 2, 3, 3A, 3B:
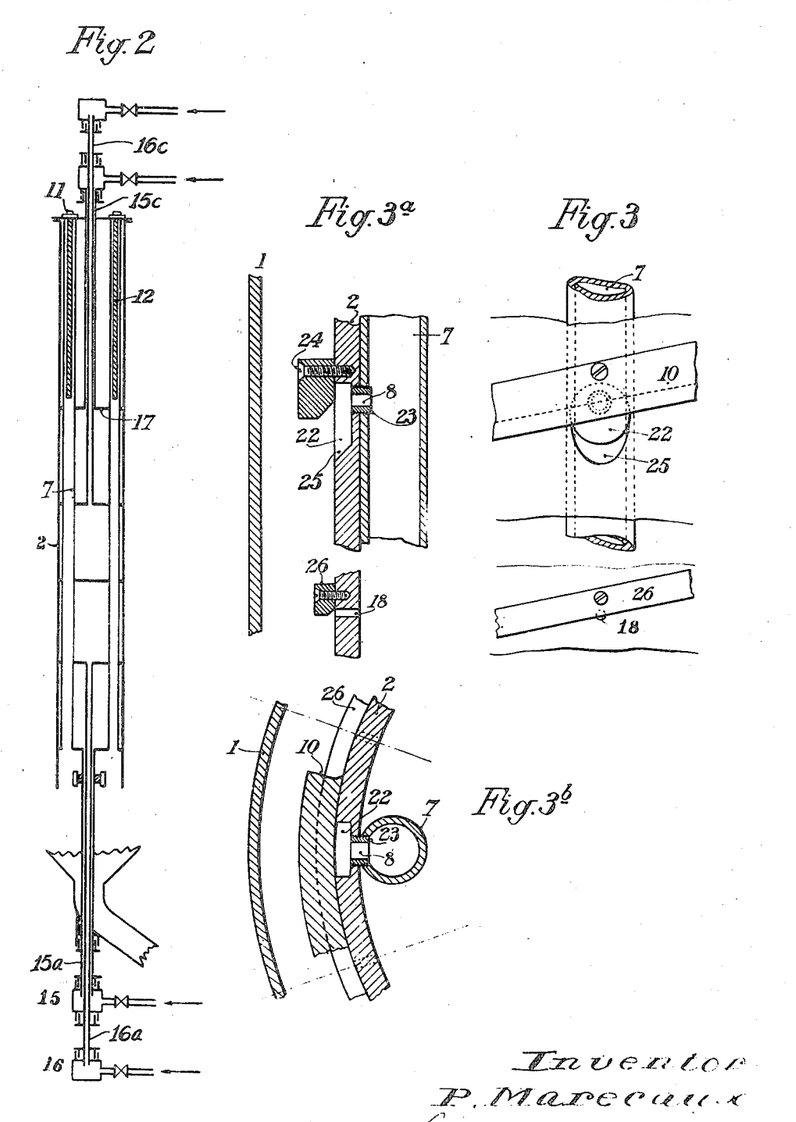
Fig. 2 shows a modification of the inner tube of the carbonization furnace proper.
Figs. 3, 3a and 3b show a detail of said tube, respectively in front view, longitudinal section and cross section on an enlarged scale.

The introduction of steam might also be arranged, in a similar manner, by superheated steam tubes 15c and 16c introduced through the top of the furnace (Fig. 2).

Furthermore, the tube 2 might be divided, by means of horizontal diaphragms, into several sections, separately fed with superheated steam by concentric tubes issuing through the top or through the bottom of the furnace, or through both ends simultaneously, into the axis of tube 2. This device, illustrated in Fig. 2, for the division of the tube into four sections, would allow of ensuring a more satisfactory dosing of the injection of superheated steam, according to the level occupied by the schist in the furnace.

A diaphragm 17 (Figs. 1 and 2) prevents the access of superheated steam and useless condensations towards the cold upper part of tube 2.

The superheated steam passes into the carbonization enclosure through orifices such as 18 (Figs. 3, 3a), but arranged, in reality, in quincunx order relatively to the vents 8, so as to obtain a steam flux as uniform as possible through the entire mass of schist. A spiral, not shown in Fig. 1, can protect the steam orifices in the same way as spiral 10 protects the vents 8.

The rotating tube 2 is hung with a certain freedom of oscillation, from a toothed crown wheel 14 (Fig. 1) rolling on a conical track, by means of a system of rollers 19 and receiving the driving impulse from the pinion 20. It is held at its lower part by a roller crown wheel 21, which can be cooled or not by a circulation of water. This device allows the rotating tube to be offset to a certain extent and to be automatically reset in position, when slight wedgings take place at certain points of the mass of schist.

Fig. 3 shows the detail of a possible form of construction of the inner tube from a thick steel tube, in which the spiral 10 and vents 8 are combined in a single device. The manifolds 7 are constituted by tubes fitted in position according to equidistant generatrices of tube 2.

The vents are constituted by recesses 22 machined in the thickness of the tube 2 and by screw-threaded or welded sleeves 23 connecting said recesses to the manifolds. The spiral 10 is secured to tube 1 by screws 24 or by any other means, so as to cover a portion of the recesses and to create a zone to which the schist cannot have access, this having for effect to protect the access to the manifolds by the sleeves 23. The lower edge of the recess is beveled at 25, so as to facilitate the disengagement of the schist and to avoid wedgings. Superheated steam is introduced into the carbonization enclosure through orifices 18, surmounted by a spiral 26 of the same pitch as spiral 10, screwed on tube 2, or secured by any other means.

The inner edge of spiral 26 can be beveled in order to allow a better protection of the orifices 18. This protection can be further reinforced by boring the orifices 18 with a certain inclination from the interior towards the exterior.

Figures 4, 5, 6, 7, 7A, 8, 9:
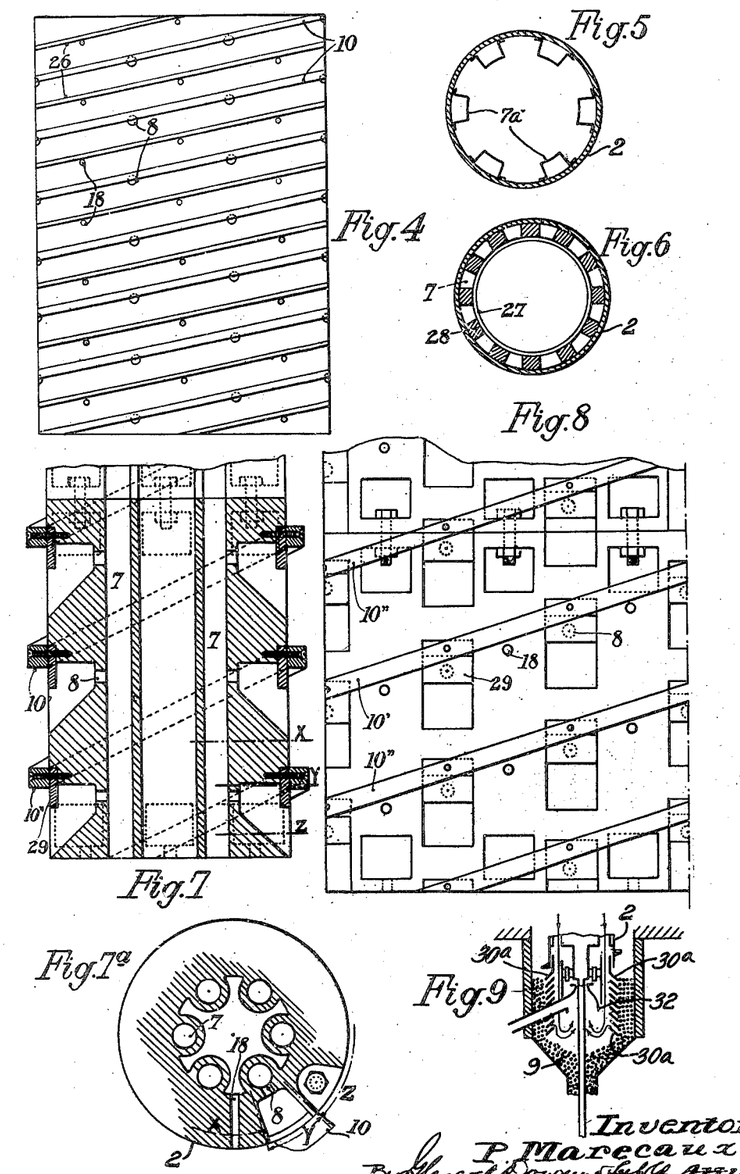
Fig. 4 is a developed view of said tube.
Figs. 5 and 6 are cross sectional views of two different modifications of said tube.
Figs. 7 and 7a are views in longitudinal section and cross section of another modification.
Fig. 8 is a developed view of this latter modification.
Fig. 9 is a modification of the lower part of the carbonization furnace proper.

Fig. 4 illustrates the development on a plane of the preceding device and shows the arrangement in quincunx order of the vents and steam orifices when the vents are distributed only on a single spiral traced on tube 2.

Fig. 5 diagrammatically shows the section of a possible modification of a rotating tube in which the manifolds are constituted by special shaped members as indicated at 7a.

Fig. 6 shows another possible modification: a tube 27 concentric with tube 2 limits an annular space within the latter, the partitioning of which, by means of filling elements 28, allows the manifolds 7 to appear.

Fig. 7 shows an embodiment of the inner pig-iron tube in the case in which the vents are distributed according to two spirals of the same pitch, traced on tube 2. The tube is constituted by sections assembled by bolts. The vents 8, manifolds 7 and superheated steam orifices 18 are cast at the same time. The spirals 10' and 10" and protecting plates 29 alone, are added and secured in position by screws or by any other means to the tube 2. Said spirals also serve for protecting the steam orifices 18 as shown in Fig. 8 illustrating a semi-development of tube 2.

The system for trapping the gases and oil vapours at the bottom of the furnace is illustrated in Fig. 1. The rotating tube 2 fits over a fixed cylindrical end piece 30, determining from its lower edge a conical slope of the schist, which creates an empty space forming expansion chamber 9 for the gases and oil vapours which arrive therein through the free space 31. The gases and oil vapours abandon in said chamber the greater part of the dust drawn along. The dust deposited is evacuated with the residue of the schist towards the recuperator.

Another advantage of the expansion chamber 9 resides in the fact that the spreading out of the schist in the form of a conical slope of relatively large area in an enclosure subjected, so to speak, directly to the partial vacuum of the extractor, ensures a final exhaustion of the schist which may still contain by adsorption a few fractions of gas and oil vapours.

This effect might eventually be increased in the case of schists retaining the oil vapours in a particularly tenacious manner, by replacing the fixed end piece 30 by a system of shutters 30a, as indicated in Fig. 9, illustrating only the lower part of the furnace.

The gases and oil vapours are sucked out of the expansion chamber by a bell 32 or any kind of deflector which subjects them to a sudden change in direction, this facilitating the deposit of the dust. The bell (or deflector) is connected to a pipe as short as possible, tangentially opening into a cylindrical vessel 33, maintained at high temperature by an insulating casing 34 (which may be replaced by a superheated steam jacket).

The expansion to which the gases and oil vapours are subjected in said vessel causes a further deposit of dust which has not been stopped in the expansion chamber 9. As said deposit takes place in the hot state, the dust precipitated only draws along the insignificant part of the heavy fractions of the oil.

The gases and oil vapours are evacuated from the vessel 33 through a vertical tube 35 which leads them into a drum surmounting the vessel. The removable closures 36 and 37 which respectively close the upper part of the tube 35 and the bottom of the vessel 33, allow easy cleaning, in case obstructions might tend to form towards the lower orifice of tube 35.

The recuperator C receives the distilled schist through the medium of the distributor 38 which adjusts the outflow of the furnace. The schist spreads out in a thick layer on a step grate 39, through which air is sucked by the fume fan 40. Said air passes through the schist of which it burns the combustible fraction and the free heat of which it recovers. It is led, thus heated, into the helical flue 6 through the medium of the conduit 41 and combustion chamber 42. The opening—more or less important of the damper 43 and the corresponding closing of the damper 44—would eventually allow of burning only a portion of the combustible fraction of the residue, in the case in which the combustion of all said fraction would supply more heat than is necessary for the furnace, for which the combustion of a small portion of the semi-coke is sufficient.

In the combustion chamber the hot air and the fumes coming from the recuperator eventually receive an addition of heat by the burner 45 consuming the rich gas returning from the condensation apparatus and, if necessary, by the auxiliary burner 46, fed with any gas or fuel.

The combustion chamber 42 is tangentially connected to the helical flue 6, so as to avoid the direct action of the flames on the heating tube 1.

Auxiliary combustion chambers, such as 47, also tangentially connected to the helical flue 6, can be arranged in any number for supplying additional quantities of heat at different levels of the furnace by means of burners such as 48, fed with any kind of fuel.

The fumes are evacuated from the furnace by the fan 40, through a chamber 49 containing a preliminary superheater 50, in which the saturated steam issuing through the tube 51 from any boiler, is subjected to an initial heating thus lowering the temperature of the fumes. The heating is continued in the superheater 52, located in the combustion chamber 42. The superheated steam is led towards the rotating tube 2 of the furnace by the tube 53. A by-pass 54, allowing a small quantity of saturated vapour to be mixed with the superheated system, ensures an accurate adjustment of the degree of heating, which might already be acted upon by the fractionation of the preliminary superheater or by introducing it into an adjustable by-pass of the circuit for the fumes. The fumes issuing from the furnace are led towards the drier A by the conduit 55 and fan 40. The drier is an internally heated apparatus, that is to say in which the fumes pass through the schist to be dried under the effect of the pressure induced by fan 40.

The calibrated raw schist is poured therein by a spout 56, into a compartment provided with an outlet 57 and communicating through a tube 58 with the drier proper. By adjusting the admission of the schist through the spout 56, so as to constantly obtain a slight excess through the outlet 57, the drier is always filled up to the bottom of tube 58, so that the fumes always encounter therein approximately the same resistance, resulting in a working speed as constant as possible in the circulation of the fumes.

The schist is extracted from the drier by the distributor 59, which must operate in synchronism with distributor 38, so as to obtain a level as constant as possible in the regularizing hopper 3. It is taken up by the bucket chain 60 which feeds the distributor 4.

The synchronisation of the various apparatus manipulating and distributing the schist is obtained in the following manner:

The outflow is determined by the speed of the distributor 38. It then suffices to adapt the speed of the distributor 59 in such a manner that the schist is maintained at a constant level in the hopper 3, the bucket chain 60 and distributor 4 may operate with a slight excess of speed which is of no importance, since these latter apparatus can only supply what is distributed to them by the distributor 59. The outlet 56 allows of maintaining a constant level in the drier notwithstanding the small variations of speed of distributor 59. The evacuation of the burnt schist from the recuperator is adjusted by a conveying screw the adjustment of the speed of which requires no accuracy, as the variations in thickness of the schist on the grate of the recuperator present no danger, even within rather wide limits. Finally, once the outflow is fixed by the distributor 38, alone the accurate adjustment of distributor 59, effected by the convenient observation of the level of the schist in the hopper 3, suffices for ensuring the synchronism of the entire plant. This adjustment can, moreover, be rendered automatic without any complication.

The fumes arising from the furnace first enter the annular chamber 61, where they are subjected to a certain cooling by exchange of heat with the schist through the wall 62 before directly entering in contact with the schist. This device completes the action of the preliminary superheater 50, which consists in lowering the temperature of the fumes without losing the heat thereof before sending them directly in contact with the schist, so as to avoid any premature distillation.

The fumes enter through the orifices 63 in the chamber 64, where they pass into the schist through openings 65. The outflow of the fumes through the openings 65 is obviously so much the more important as the openings are located higher up in the drier. The schist is therefore more violently swept by the fumes in the upper part of the drier, precisely where the evacuation of the dust is possible, owing to the proximity of the evacuation of the fumes 66. The removal of dust from the schist is therefore effected very efficiently in the upper part of the drier. The desiccation of the schist continues in the middle portion and lower part of the drier, slightly by the direct action of the fumes, more so by the transmission of heat through the walls and therefore without appreciable risk of premature distillation.

It is to be understood that the invention is not limited in any way to the embodiments which have just been described simply as an indication and not in a limiting sense and that modifications can be made therein without departing thereby from the scope of the present invention.

Figure 10:
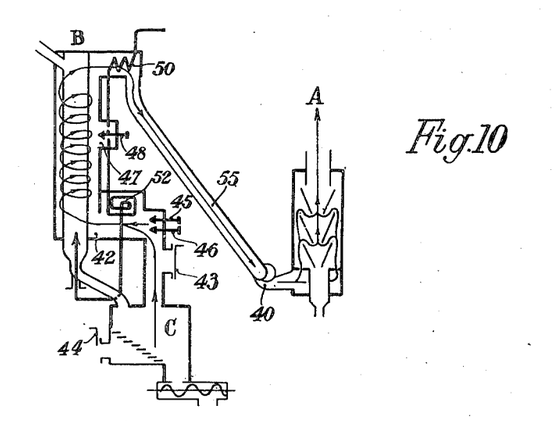
Fig. 10 illustrates the heat diagram of the plant shown in Fig. 1.
Figure 11:
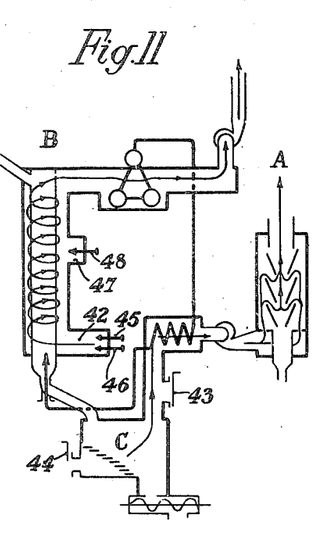
Figs. 11, 12 and 13 show modifications of the heat flow diagram of Fig. 10.
Figure 12:
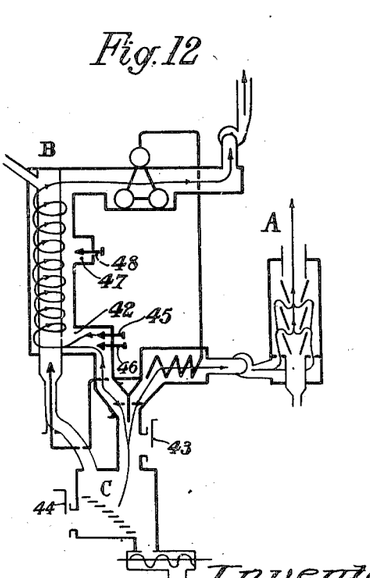

It is thus, for instance, that the heat diagram, illustrated in Fig. 10, of the plant such as it has just been described, can be easily modified in order to be adapted to the different properties of the schist or fuel to be carbonized, in particular, its humidity and the calorific power of the residue. Fig. 11 illustrates for instance, the diagram of a plant in which the hot fumes issuing from the recuperator are first used in the superheater and then pass to the drier which terminates the exhaustion of the useful heat thereof and in which the fumes issuing from the furnace and arising only from the burners of the combustion chambers terminate their exhaustion in a boiler producing the steam supplying the superheater. This device is more suitable for the treatment of particularly damp schists or fuels. The diagram shown in Fig. 12, which is a combination of the two preceding diagrams would be suitable for the treatment of a very damp fuel, the carbonization residue of which would have a high calorific power. In this latter case, the burners of the combustion chambers would only serve to supply an additional adjustment, the combustion of the residue ensuring approximately the entire amount of heat necessary.

Figure 13:
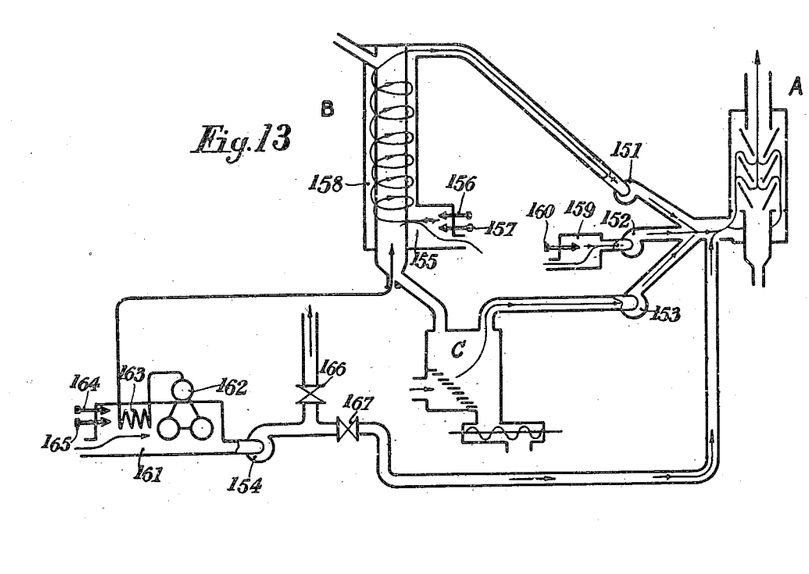

According to the modification shown in Fig. 13, four fans 151, 152, 153 and 154 send gases into the drier A.

Fan 151 sucks the burnt gases in the combustion chamber 155 of the furnace B, coming from a poor gas burner 156 and a rich gas burner 157 and having passed through the annular chamber 158 of said furnace B.

Fan 152 sucks the burnt gases in a special combustion chamber 159, fed by a poor gas burner 160.

Fan 153 sucks the gases coming from the recovery device C.

Fan 154 sucks the gases coming from the furnace 161 of the boiler 162 and superheater 163, fed by the rich gas burner 164 and poor gas burner 165; valves 166 and 167 allow of sending said gases at will to the drier A or towards the evacuation stack.

Owing to the independence thus obtained of the adjustment of the carbonization furnace, boiler and drier, the operation of each of these apparatus can be ensured in the optimum conditions.

What I claim as my invention and desire to secure by Letters Patent is:

1. A plant for the low temperature carbonization of schist and the like solid fuel comprising a heat treating furnace including an outer vertical stationary cylinder, a second inner cylinder coaxial with the first cylinder, adapted to rotate round its axis and defining with said first cylinder an annular gap, means for feeding the solid fuel to the upper end of said annular gap, at least one vertical tube rigid with the inner wall of the rotary cylinder, a helical sloping member secured to the outer wall of the second cylinder and wound in a direction opposing rotation for urging upwardly the fuel in the annular gap against the action of gravity, ducts for feeding superheated steam to the lower end of the second cylinder, a series of ports being provided in the wall of the second cylinder for forming an outlet for the steam from the inside to the outside of the cylinder, a second series of ports being provided through the wall of the second cylinder and corresponding ports being provided in the wall of the vertical tubes for cooperation with the ports of the second series and ensuring communication between the annular gap and the inside of the vertical tubes, a vapor condensing device fed with the gases and vapors evolved from the fuel in the annular gap through last mentioned cooperating ports and vertical tubes, means for removing the treated fuel from the lower part of the annular gap and including a distributor for adjusting the output of the furnace, a combustion furnace fed by last mentioned means and including a grate on which said fuel is adapted to fall at the outlet of last mentioned means and means for feeding air under said grate for burning the fuel thereon, a flue communicating with the combustion furnace above the grate through which the air heated by the combustion of the fuel and by the heat contained therein and accompanying smokes produced by said combustion are adapted to rise, a channel helically wound round the first stationary tube, a drier for the fuel and means for feeding hot aeriform fluid including that passing out of the combustion chamber into said helical channel and into said drier.

2. A plant for the low temperature carbonization of schist and the like solid fuel comprising a heat treating furnace including an outer vertical stationary cylinder, a second inner cylinder coaxial with the first cylinder, adapted to rotate round its axis and defining with said first cylinder an annular gap, means for feeding the solid fuel to the upper end of said annular gap, at least one vertical tube rigid with the inner wall of the rotary cylinder, a helical sloping member secured to the outer wall of the second cylinder and wound in a direction opposing rotation for urging upwardly the fuel in the annular gap against the action of gravity, ducts for feeding superheated steam to the lower end of the second cylinder, a series of ports being provided in the wall of the second cylinder for forming an outlet for the steam from the inside to the outside of the cylinder, a second series of ports being provided through the wall of the second cylinder and corresponding ports being provided in the wall of the vertical tubes for cooperation with the ports of the second series and ensuring communication between the annular gap and the inside of the vertical tubes, a vapor condensing device fed with the gases and vapors evolved from the fuel in the annular gap through last mentioned cooperating ports and vertical tubes, means for removing the treated fuel from the lower part of the annular gap and including a distributor for adjusting the output of the furnace, a combustion furnace fed by last mentioned means and including a grate on which said fuel is adapted to fall at the outlet of last mentioned means and means for feeding air under such grate for burning the fuel thereon, a flue communicating with the combustion furnace above the grate through which the air heated by the combustion of the fuel and by the heat contained therein and accompanying smokes produced by said combustion are adapted to rise, a steam superheater housed inside said flue and connected with the above mentioned steam feeding ducts, a channel helically wound round the first stationary tube, a drier for the fuel and means for feeding hot aeriform fluid including that passing out of the combustion chamber into said helical channel and into said drier.

3. A plant for the low temperature carbonization of schist and the like solid fuel comprising a heat treating furnace including an outer vertical stationary cylinder, a second inner cylinder coaxial with the first cylinder, adapted to rotate round its axis and defining with said first cylinder an annular gap, means for feeding the solid fuel to the upper end of said annular gap, at least one vertical tube rigid with the inner wall of the rotary cylinder, a helical sloping member secured to the outer wall of the second cylinder and wound in a direction opposing rotation for urging upwardly the fuel in the annular gap against the action of gravity, ducts for feeding superheated steam to the lower end of the second cylinder, a series of ports being provided in the wall of the second cylinder for forming an outlet for the steam from the inside to the outside of the cylinder, a second series of ports being provided through the wall of the second cylinder and corresponding ports being provided in the wall of the vertical tubes for cooperation with the ports of the second series and ensuring communication between the annular gap and the inside of the vertical tubes, a vapor condensing device fed with the gases and vapors evolved from the fuel in the annular gap through last mentioned cooperating ports and vertical tubes, means for removing the treated fuel from the lower part of the annular gap and including a distributor for adjusting the output of the furnace, a combustion furnace fed by last mentioned means and including a grate on which said fuel is adapted to fall at the outlet of last mentioned means and means for feeding air under said grate for burning the fuel thereon, a flue communicating with the combustion furnace above the grate through which the air heated by the combustion of the fuel and by the heat contained therein and accompanying smokes produced by said combustion are adapted to rise, a channel helically wound round the first stationary tube, a double superheater including a lower portion in the upper end of flue and a further portion in the outlet of the helically wound channel, means whereby said superheater feeds the steam feeding ducts opening in the inner tube, a drier for the fuel and means for feeding hot aeriform fluid including that passing out of the combustion chamber into said helical channel and into said drier.

4. A plant for the low temperature carbonization of schist and the like solid fuel comprising a heat treating furnace including an outer vertical stationary cylinder, a second inner cylinder coaxial with the first cylinder, adapted to rotate round its axis and defining with said first cylinder an annular gap, means for feeding the solid fuel to the upper end of said annular gap, at least one vertical tube rigid with the inner wall of the rotary cylinder, a helical sloping member secured to the outer wall of the second cylinder and wound in a direction opposing rotation for urging upwardly the fuel in the annular gap against the action of gravity, ducts for feeding superheated steam to the lower end of the second cylinder, a series of ports being provided in the wall of the second cylinder for forming an outlet for the steam from the inside to the outside of the cylinder, a second series of ports being provided through the wall of the second cylinder and corresponding ports being provided in the wall of the vertical tubes for cooperation with the ports of the second series and ensuring communication between the annular gap and the inside of the vertical tube, a vapor condensing device fed with the gases and vapors evolved from the fuel in the annular gap through last mentioned cooperating ports and vertical tubes, means for removing the treated fuel from the lower part of the annular gap and including a distributor for adjusting the output of the furnace, a combustion furnace fed by last mentioned means and including a grate on which said fuel is adapted to fall at the outlet of last mentioned means and means for feeding air under said grate for burning the fuel thereon, a flue communicating with the combustion furnace above the grate through which the air heated by the combustion of the fuel and by the heat contained therein and accompanying smokes produced by said combustion are adapted to rise, auxiliary combustion chambers opening into the flue and burners for said combustion chambers, a channel helically wound round the first stationary tube, a drier for the fuel and means for feeding hot aeriform fluid including that passing out of the combustion chamber and furnace into said helical channel and into said drier.

5. A plant for the low temperature carbonization of schist and the like solid fuel comprising a heat treating furnace including an outer vertical stationary cylinder, a second inner cylinder coaxial with the first cylinder, adapted to rotate round its axis and defining with said first cylinder an annular gap, means for feeding the solid fuel to the upper end of said annular gap, a helical sloping member secured to the outer wall of the second cylinder and wound in a direction opposing rotation for urging upwardly the fuel in the annular gap against the action of gravity, a helical channel wound round the outer wall of the first cylinder, means for feeding a hot fluid to said channel, vertical tubes rigid with the inner wall of the second cylinder, ducts for feeding superheated steam to the lower end of the second cylinder, two series of perforations in the wall of said cylinder of which one provides for the passage of the superheated steam from the inside to the outside of the cylinder, openings being provided through the walls of the vertical tubes for cooperation with the ports of the second series for the passage of the distilled fluid from the annular gap between the two cylinders into the inside of the vertical tubes, means for collecting the distilled fluid at the lower end of the vertical tubes and a condensing device fed by last mentioned means.

6. A plant for the low temperature carbonization of schist and the like solid fuel comprising a heat treating furnace including an outer vertical stationary cylinder, a second inner cylinder coaxial with the first cylinder, adapted to rotate round its axis and defining with said first cylinder an annular gap, means for feeding the solid fuel to the upper end of said annular gap, a helical sloping member secured to the outer wall of the second cylinder and wound in a direction opposing rotation for urging upwardly the fuel in the annular gap against the action of gravity, a helical channel wound round the outer wall of the first cylinder, means for feeding a hot fluid to said channel, vertical tubes rigid with the inner wall of the second cylinder, ducts for feeding superheated steam to the lower end of the second cylinder, two series of perforations in the wall of said cylinder of which one provides for the passage of the superheated steam from the inside to the outside of the cylinder, openings being provided through the walls of the vertical tubes for cooperation with the ports of the second series for the passage of the distilled fluid from the annular gap between the two cylinders into the inside of the vertical tubes and including a heat insulated separator at the lower end of the vertical tubes for allowing expansion of the distilled fluid and deposition of the dust carried along by said fluid and a condensing device fed by last mentioned means.

7. A plant for the low temperature carbonization of schist and the like solid fuel comprising a heat treating furnace including an outer vertical stationary cylinder, a second inner cylinder coaxial with the first cylinder, adapted to rotate round its axis and defining with said first cylinder an annular gap, means for feeding the solid fuel to the upper end of said annular gap, a helical sloping member secured to the outer wall of the second cylinder and wound in a direction opposing rotation for urging upwardly the fuel in the annular gap against the action of gravity, a helical channel wound round the outer wall of the first cylinder, means for feeding a hot fluid to said channel, vertical tubes rigid with the inner wall of the second cylinder, ducts for feeding superheated steam to the lower end of the second cylinder, two series of perforations in the wall of said cylinder of which one provides for the passage of the superheated steam from the inside to the outside of said cylinder, the ports of at least one series opening into the annular gap just underneath the helical sloping member whereby they are protected against the inflow of the falling fuel, openings being provided through the walls of the vertical tubes for cooperation with the ports of the second series for the passage of the distilled fluid from the annular gap between the two cylinders into the inside of the vertical tubes, means for collecting the distilled fluid at the lower end of the vertical tubes and a condensing device fed by last mentioned means.

8. A plant for the low temperature carbonization of schist and the like solid fuel comprising a heat treating furnace including an outer vertical stationary cylinder, a second inner cylinder coaxial with the first cylinder, adapted to rotate round its axis and defining with said first cylinder an annular gap, means for feeding the solid fuel to the upper end of said annular gap, a helical sloping member secured to the outer wall of the second cylinder and wound in a direction opposing rotation for urging upwardly the fuel in the annular gap against the action of gravity, a helical channel wound round the outer wall of the first cylinder, means for feeding a hot fluid to said channel, vertical tubes rigid with the inner wall of the second cylinder, ducts for feeding suprheated steam to the lower end of the second cylinder, two series of perforations in the wall of said cylinder of which one provides for the passage of the superheated steam from the inside to the outside of said cylinder, openings being provided through the walls of the vertical tubes for cooperation with the ports of the second series for the passage of the distilled fluid from the annular gap between the two cylinders into the inside of the vertical tubes, means for collecting the distilled fluid at the lower end of the vertical tubes and including a stationary tubular section into which the lower end of the rotary cylinder opens, a deflector inside said section and an outlet for the gasiform distilled fluid opening into the wall of the tubular section underneath said deflector and a condensing device fed by last mentioned means through the outlet thereof.

9. A plant for the low temperature carbonization of schist and the like solid fuel comprising a heat treating furnace including an outer vertical stationary cylinder, a second inner cylinder coaxial with the first cylinder, adapted to rotate round its axis and defining with said first cylinder an annular gap, means for suspending the upper end of said rotary cylinder to that of the outer cylinder so as to allow it to rock slightly away from verticality in all directions, means for feeding the solid fuel to the upper end of said annular gap, a helical sloping member secured to the outer wall of the second cylinder and wound in a direction opposing rotation for urging upwardly the fuel in the annular gap against the action of gravity, a helical channel wound round the outer wall of the first cylinder, means for feeding a hot fluid to said channel, vertical tubes rigid with the inner wall of the second cylinder, ducts for feeding superheated steam to the lower end of the second cylinder, two series of perforations in the wall of said cylinder of which one provides for the passage of the superheated steam from the inside to the outside of the cylinder, openings being provided through the walls of the vertical tubes for cooperation with the ports of the second series for the passage of the distilled fluid from the annular gap between the two cylinders into the inside of the vertical tubes, means for collecting the distilled fluid at the lower end of the vertical tubes and a condensing device fed by last mentioned means.

10. A plant for the low temperature carbonization of schist and the like solid fuel comprising a heat treating furnace including an outer vertical stationary cylinder, a second inner cylinder coaxial with the first cylinder, adapted to rotate round its axis and defining with said first cylinder an annular gap, means for feeding the solid fuel to the upper end of said annular gap, at least one vertical tube rigid with the inner wall of the rotary cylinder, a helical sloping member secured to the outer wall of the second cylinder and wound in a direction opposing rotation for urging upwardly the fuel in the annular gap against the action of gravity, ducts for feeding superheated steam to the lower end of the second cylinder, a series of ports being provided in the wall of the second cylinder for forming an outlet for the steam from the inside to the outside of the cylinder, a second series of ports being provided through the wall of the second cylinder and corresponding ports being provided in the wall of the vertical tubes for cooperation with the ports of the second series and ensuring communication between the annular gap and the inside of the vertical tubes, a vapor condensing device fed with the gases and vapors evolved from the fuel in the annular gap through last mentioned cooperating ports and vertical tubes, means for removing the treated fuel from the lower part of the annular gap and including a distributor for adjusting the output of the furnace, a combustion furnace fed by last mentioned means and including a grate on which said fuel is adapted to fall at the outlet of last mentioned means and means for feeding air under said grate for burning the fuel thereon, a flue communicating with the combustion furnace above the grate through which the air heated by the combustion of the fuel and by the heat contained therein and accompanying smokes produced by said combustion are adapted to rise, a channel helically wound round the first stationary tube, a drier for the fuel, means for feeding the helical channel with the hot aeriform fluid passing out of the combustion chamber and means for connecting the outlet of the helical channel with the drier.

11. A plant for the low temperature carbonization of schist and the like solid fuel comprising a heat treating furnace including an outer vertical stationary cylinder, a second inner cylinder coaxial with the first cylinder, adapted to rotate round its axis and defining with said first cylinder an annular gap, means for feeding the solid fuel to the upper end of said annular gap, at least one vertical tube rigid with the inner wall of the rotary cylinder, a helical sloping member secured to the outer wall of the second cylinder and wound in a direction opposing rotation for urging upwardly the fuel in the annular gap against the action of gravity, ducts for feeding superheated steam to the lower end of the second cylinder, a series of ports being provided in the wall of the second cylinder for forming an outlet for the steam from the inside to the outside of the cylinder, a second series of ports being provided through the wall of the second cylinder and corresponding ports being provided in the wall of the vertical tubes for cooperation with the ports of the second series and ensuring communication between the annular gap and the inside of the vertical tubes, a vapor condensing device fed with the gases and vapors evolved from the fuel in the annular gap through last mentioned cooperating ports and vertical tubes, means for removing the treated fuel from the lower part of the annular gap and including a distributor for adjusting the output of the furnace, a combustion furnace fed by last mentioned means and including a grate on which said fuel is adapted to fall at the outlet of last mentioned means and means for feeding air under such grate for burning the fuel thereon, a flue communicating with the combustion furnace above the grate through which the air heated by the combustion of the fuel and by the heat contained therein and accompanying smokes produced by said combustion are adapted to rise, auxiliary combustion chambers opening into the flue and burners for said combustion chambers, a channel helically wound round the first stationary tube, a double superheater including a lower portion in the upper end of flue and a further portion in the outlet of the helically wound channel, means whereby said superheater feeds the steam feeding ducts opening in the inner tube, a drier for the fuel, means for feeding the helical channel with the hot aeriform fluid passing out the combustion chamber and means for connecting the outlet of the helical channel with the drier.

PAUL MARECAUX.

REFERENCES CITED

The following references are of record in the file of this patent:

UNITED STATES PATENTS

| Number | Name | Date |
|---|---|---|
| 350,170 | Stillman | Oct. 5, 1886 |
| 1,296,247 | Wilkinson | Mar. 4, 1919 |
| 1,365,822 | Galloupe | Jan. 18, 1921 |
| 1,713,032 | Debauche | May 14, 1929 |
| 1,838,622 | Herrick | Dec. 29, 1931 |
| 2,165,143 | Karrick | July 4, 1939 |
| 2,167,503 | Gilles | July 25, 1939 |

OTHER REFERENCES

McKee: Shale Oil, Book Department, The Chemical Catalog Co., Inc., New York city, 1925; pages 162 and 163. Copy in Div. 25.